United States Patent [19]

Yamamoto et al.

[11] 4,425,635
[45] Jan. 10, 1984

[54] FISH SONAR

[75] Inventors: Shigeo Yamamoto; Kazuto Kobayashi, both of Toyohashi, Japan

[73] Assignee: Keisuke Honda, Aichi, Japan

[21] Appl. No.: 216,922

[22] Filed: Dec. 16, 1980

[30] Foreign Application Priority Data

May 30, 1980 [JP] Japan .................................. 55-71478
May 30, 1980 [JP] Japan .................................. 55-71479

[51] Int. Cl.³ .......................... G01S 3/80; G01S 15/96
[52] U.S. Cl. ...................................... 367/125; 367/97; 367/115
[58] Field of Search ................ 367/125, 97, 120, 121, 367/122, 123, 124; 324/83 D

[56] References Cited

U.S. PATENT DOCUMENTS

| 3,163,844 | 12/1964 | Martin | 367/122 X |
| 3,548,321 | 12/1970 | Duquesne | 324/83 D X |
| 3,600,690 | 8/1971 | White | 324/83 D X |
| 3,660,647 | 5/1972 | Pryor, Jr. | 364/728 |
| 3,696,328 | 10/1972 | Schwartz | 367/125 |
| 3,906,361 | 9/1975 | Nessler et al. | 324/83 D |
| 3,922,630 | 11/1975 | Murphree | 367/97 |
| 3,922,634 | 11/1975 | Warner | 367/97 |
| 4,204,281 | 5/1980 | Hagemann | 367/125 |

FOREIGN PATENT DOCUMENTS 946839  1/1964  United Kingdom .................. 367/97

Primary Examiner—Richard A. Farley
Attorney, Agent, or Firm—Burgess, Ryan & Wayne

[57] ABSTRACT

A fish sonar is capable of detecting ultrasonic waves from a desired direction by shaping the waveforms of the outputs of a pair of vibrators spaced apart by a certain distance, and detecting a delay of the output from one of the vibrators with respect to that of the other of the vibrators so as to detect the direction of the ultrasonic waves coming to the pair of vibrators and to delay the output of the other of the vibrators with respect to the output of one of the vibrators.

2 Claims, 21 Drawing Figures

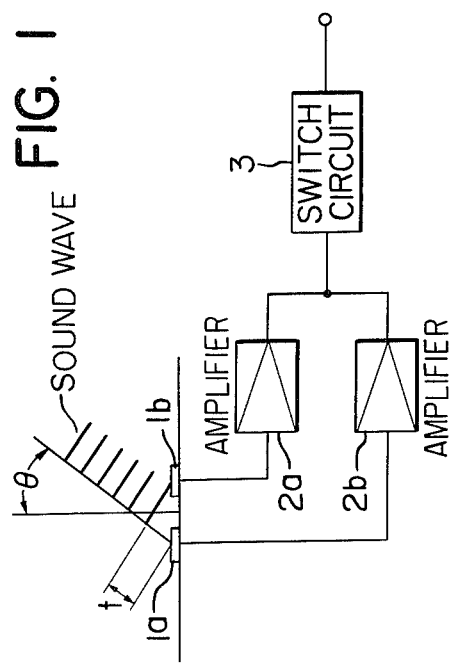
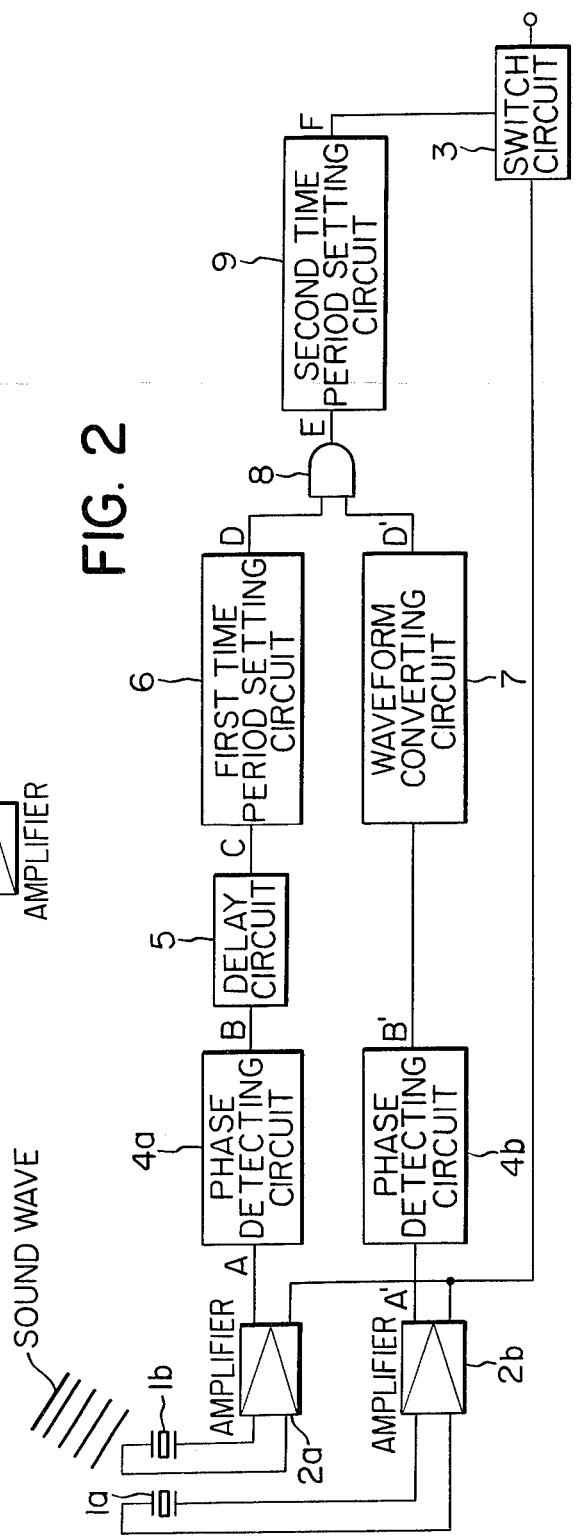

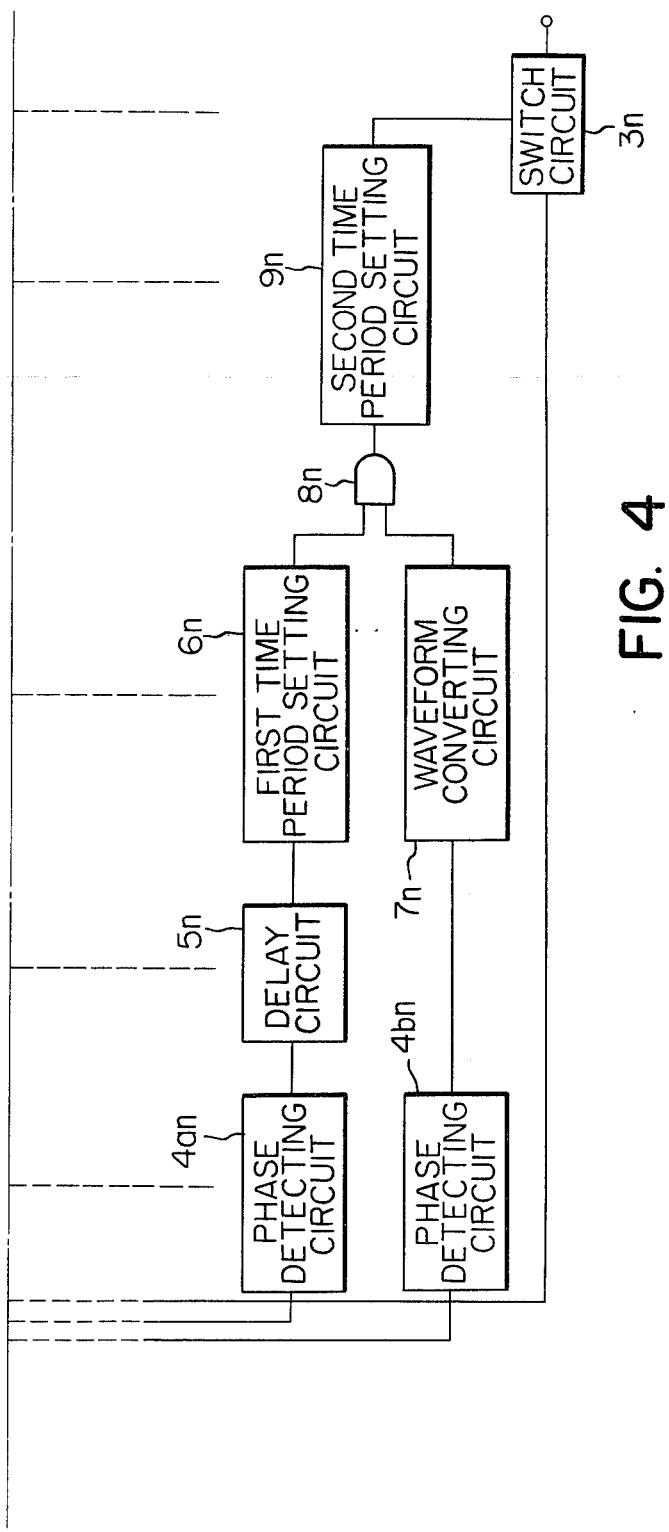

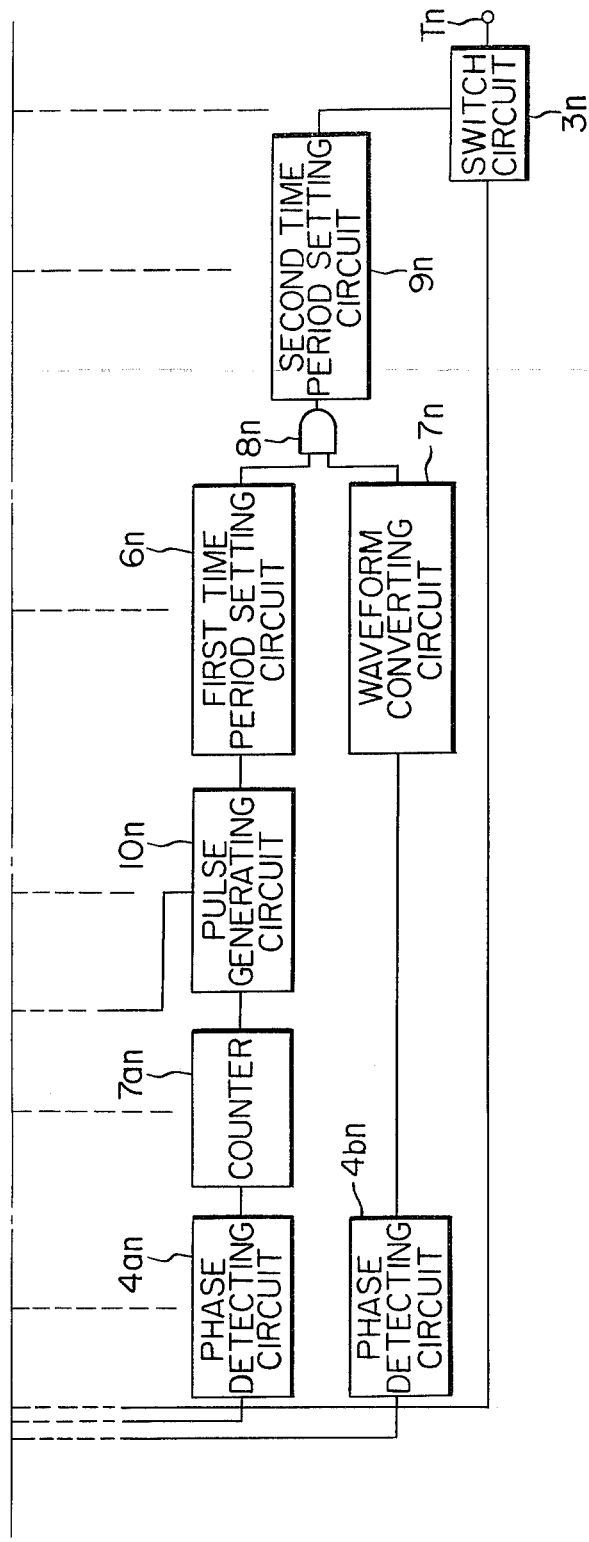

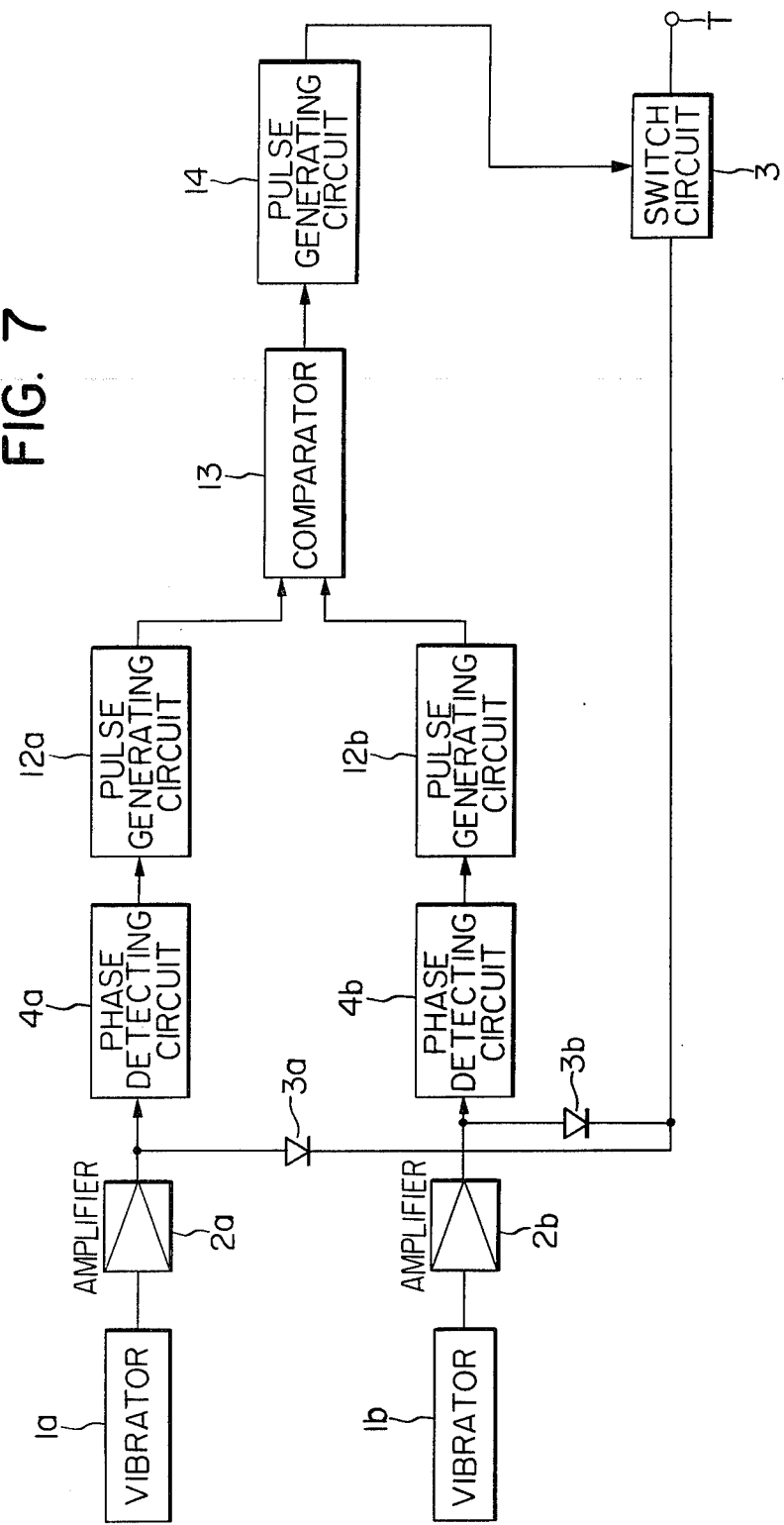

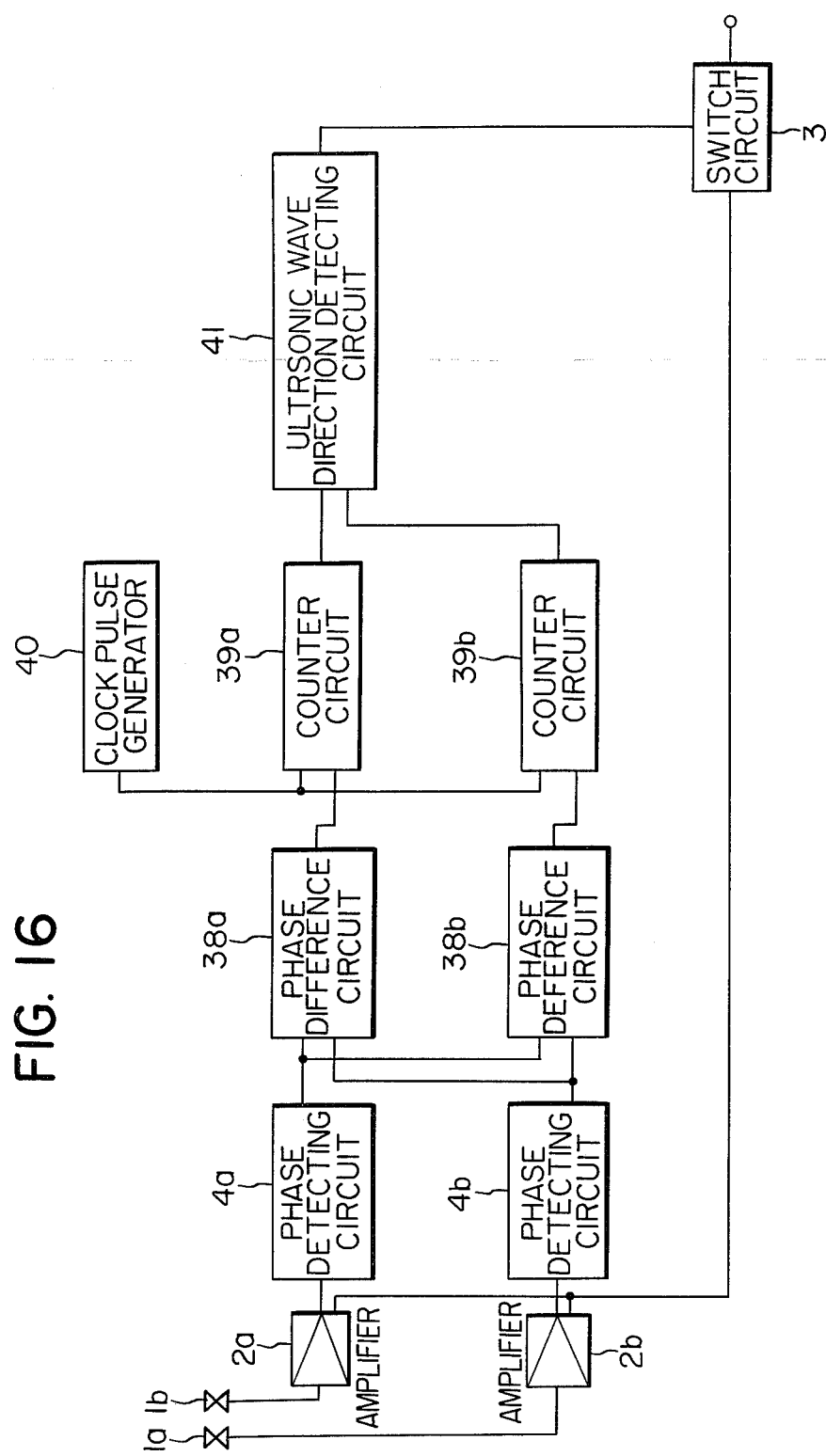

FISH SONAR

BACKGROUND OF THE INVENTION

The present invention relates to a fish sonar which receives by a pair of stationary vibrators sound waves coming from any direction.

A sonar for receiving ultrasonic waves coming from any direction is conventionally known in which one vibrator is rotated by a scanning mechanism, and the receiving surface of the vibrator receives ultrasonic waves from this direction.

However, a conventional sonar of this type has been defective in that it requires a scanning mechanism for rotating the vibrator, so that the device becomes complex.

A sonar is also known in which a number of vibrators are arranged in an arc shape instead of rotating the single vibrator by a scanning mechanism. However, such a sonar has been defective in that the mechanism for rotating the respective vibrators becomes complex.

For improving the directional characteristics of the vibrator, the diameter of the vibrator is enlarged or a number of vibrators are used. However, when the diameter of the vibrator is enlarged, the directional characteristics cannot be improved since submaximum values are received. When a number of vibrators are used, the device becomes large, and adjustment procedures become complex.

SUMMARY OF THE INVENTION

It is, therefore, the primary object of the present invention to provide a fish sonar which is capable of receiving ultrasonic waves coming from any direction with a simple circuit.

It is another object of the present invention to provide a fish sonar which is capable of receiving ultrasonic waves from a desired direction without having to move a pair of vibrators.

It is still another object of the present invention to provide a fish sonar which has improved directional characteristics for the received waves.

In order to accomplish the above and other objects, the present invention provides a fish sonar comprising: phase difference detecting means consisting of phase difference setting means for passing only signals of predetermined phase difference alone among the signals reaching the pair of vibrators, and signal passing means for passing the signals from said vibrators for a predetermined period of time in response to an output signal of said phase difference setting means, said phase difference detecting means being capable of detecting the phase difference of signals reaching a pair of vibrators and detecting ultrasonic waves from any direction of said vibrators; counter circuits for counting clock pulses for the phase difference time alone of said phase difference detecting means; and an ultrasonic wave direction detecting circuit for judging by the smaller counted numbers of said counter circuits the direction of incident ultrasonic waves.

BRIEF DESCRIPTION OF THE DRAWINGS

FIG. 1 is a view illustrating the principle of the present invention;

FIG. 2 is a block diagram of the first embodiment of the present invention;

FIGS. 4A and 4B are block diagrams of the second embodiment of the present invention;

FIG. 4 is a diagram showing the relative positions of FIGS. 4A and 4B;

FIGS. 6A and 6B are block diagrams of the fourth embodiment of the present invention;

FIG. 6 is a diagram showing the relative positions of FIGS. 6A and 6B;

FIG. 7 is a block diagram of the fifth embodiment of the present invention;

FIG. 16 is a block diagram of the seventh embodiment of the present invention.

DESCRIPTION OF THE PREFERRED EMBODIMENTS

Figure 3:
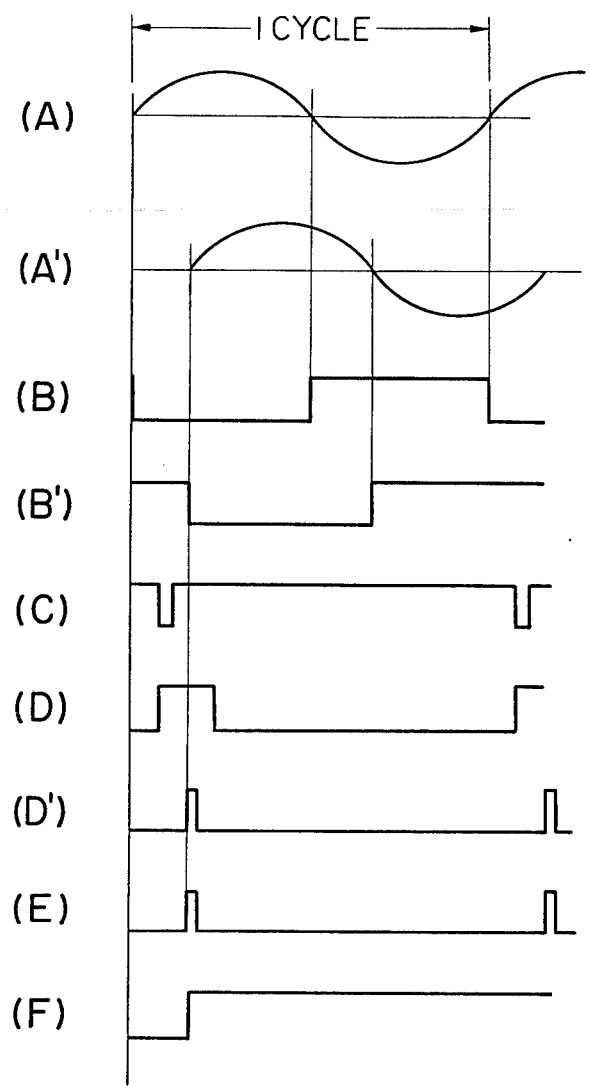
FIG. 3 is a view illustrating output waveforms of respective parts of FIG. 2.

FIG. 1 shows the principle of the present invention wherein 1a and 1b denote vibrators, 2a and 2b denote amplifiers, and 3 denotes a switch. With this construction, when the vibrators 1a and 1b are coplanar for receiving sound waves, a time difference t is generated corresponding to an angle, $\theta$ formed by the normal to the vibrator plane and the sound source. When this angle $\theta$ is 0°, the time difference t=0. When the angle $\theta$ is 90°, t becomes maximum. When the on time of the switch 3 is so set that the time difference t is the time difference obtained with the angle $\theta$ within the range of 0 to 90°, sound waves from the direction of the angle corresponding to the set time difference may be received.

FIG. 2 shows the first embodiment of the present invention utilizing the above principle, wherein 1a and 1b denote vibrators; 2a and 2b, amplifiers; 3, a switch circuit; 4a and 4b, phase detecting circuits; 5, a delay circuit; 6, a first time period setting circuit; 7, a waveform converting circuit; 8, an AND gate; and 9, a second time period setting circuit.

The mode of operation of this embodiment will be described with reference to FIG. 3. Signals from the vibrators 1a and 1b are amplified by the respective amplifiers 2a and 2b (FIG. 3(A), (A')), and pulses which rise and fall at the points where the waveforms change from the negative side to the positive side and from the positive side to the negative side, respectively, are output by the phase detecting circuits 4a and 4b (FIG. 3(B), (B')). The output of the phase detecting circuit 4a alone is dalayed by a delay circuit 5 which is capable of arbitrarily setting the delay period (FIG. 3(C)). The output of the delay circuit 5 is input to the first time period setting circuit 6 (monostable multivibrator) in which a pulse which continues for a certain period of time when the output of the delay circuit 5 is input to the first time period setting circuit 6 is output. (FIG. 3(D)).

Figure 4A:
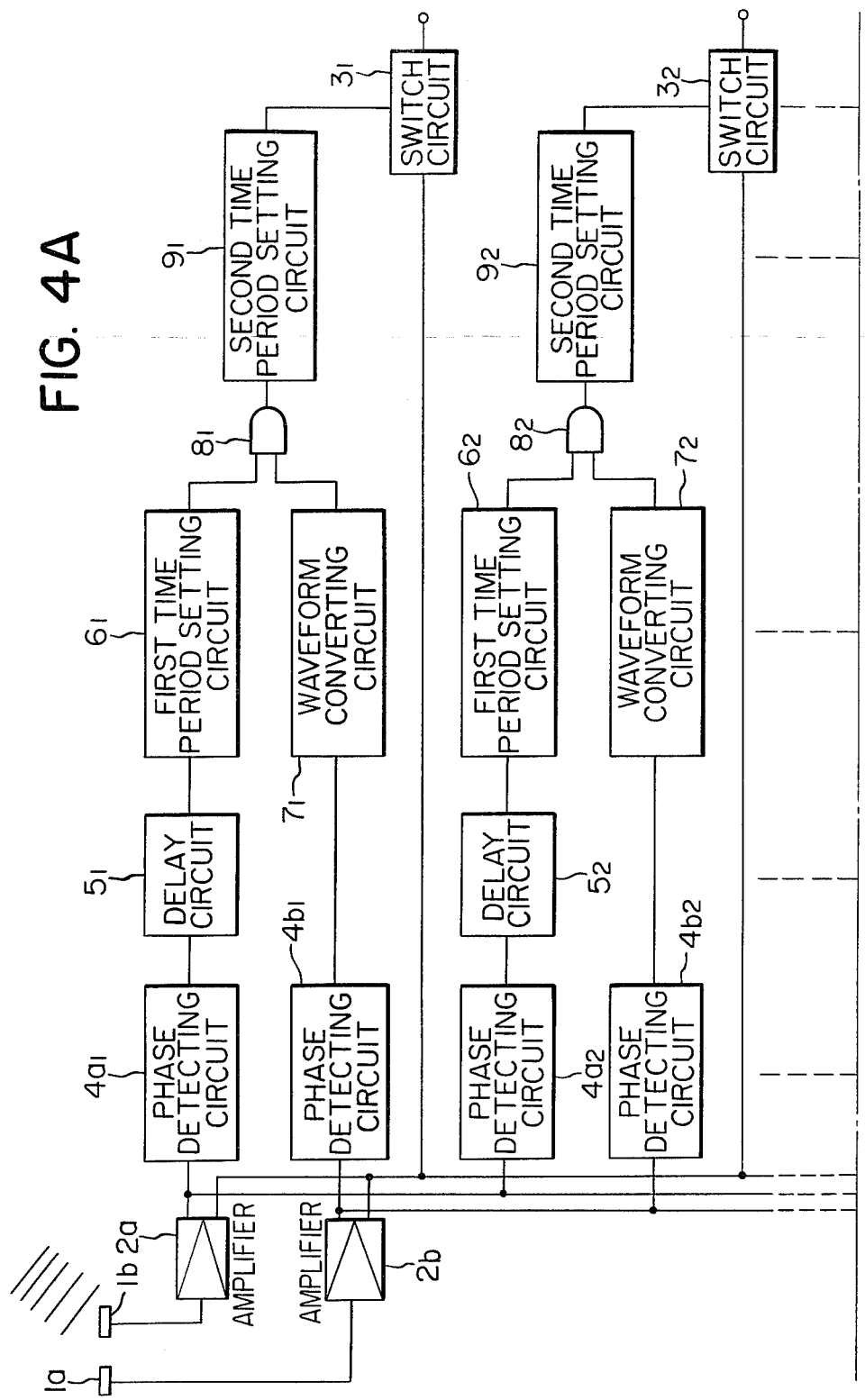

The output of the phase detecting circuit $4b$ is input to the waveform converting circuit 7, and it outputs pulses (FIG. 4(D')) only at the falling edges of the output of the phase detecting circuit $4b$ (FIG. 3(B')). The output of the waveform converting circuit 7 and the output of the first time period setting circuit 6 are input to the AND gate 8. When these outputs correspond with each other, a trigger signal (FIG. 3(E)) is output from the AND gate 8. This trigger signal is input to the second time period setting circuit 9. The second time period setting circuit 9 outputs a signal (FIG. 3(F)) corresponding to about one cycle of the ultrasonic wave input signal, which is input to the switch circuit 3 and the outputs of the amplifiers $2a$ and $2b$ are output to a terminal. Only one output may be obtained from the amplifiers.

With this construction, an output signal may be obtained when the ultrasonic waves are received from the direction corresponding to the time set by the delay circuit 5.

Although the delay circuit 5 is connected to the side of the vibrator $1b$ in the above embodiment, ultrasonic waves from the left side of the figure may be detected when it is connected to the side of the vibrator $1a$.

FIG. 4 shows the second embodiment of the present invention. A plurality of phase detecting circuits $4a_1$ to $4a_n$ and $4b_1$ to $4b_n$ are connected to the amplifiers $2a$ and $2b$ for amplifying the outputs of the pair of vibrators $1a$ and $1b$. Delay circuits $5_1$ to $5_n$ are connected to the respective detectors $4a_1$ to $4a_n$, and first time period setting circuits $6_1$ to $6_n$ are connected to respective delay circuits $5_1$ to $5_n$. Waveform converting circuits $7_1$ to $7_n$ are connected to the respective phase detecting circuits $4b_1$ to $4b_n$. AND gates $8_1$ to $8_n$ are connected to the output sides of the first time period setting circuits $6_1$ to $6_n$ and to the output sides of the waveform converting circuits $7_1$ to $7_n$. Second time period setting circuits $9_1$ to $9_n$ are connected to the output sides of the AND gates $8_1$ to $8_n$.

In the circuit of this embodiment, the delay time of the delay circuits $5_1$ to $5_n$ and the time period of the output pulses of the first time period setting circuits $6_1$ to $6_n$ are set to predetermined values, so it becomes possible to instantaneously judge from which direction of the vibrators $1a$ and $1b$ are obtained the outputs from output terminals $T_1$ to $T_n$ of switch circuits $3_1$ to $3_n$ controlled by the second time period setting circuits $9_1$ to $9_n$. Referring to FIG. 4, when the delay circuits $5_1$ to $5_n$ and the first time period setting circuits 6 are connected to the side of the vibrator $1b$, the ultrasonic waves from the side of the vibrator $1a$ may be detected.

Figure 5:
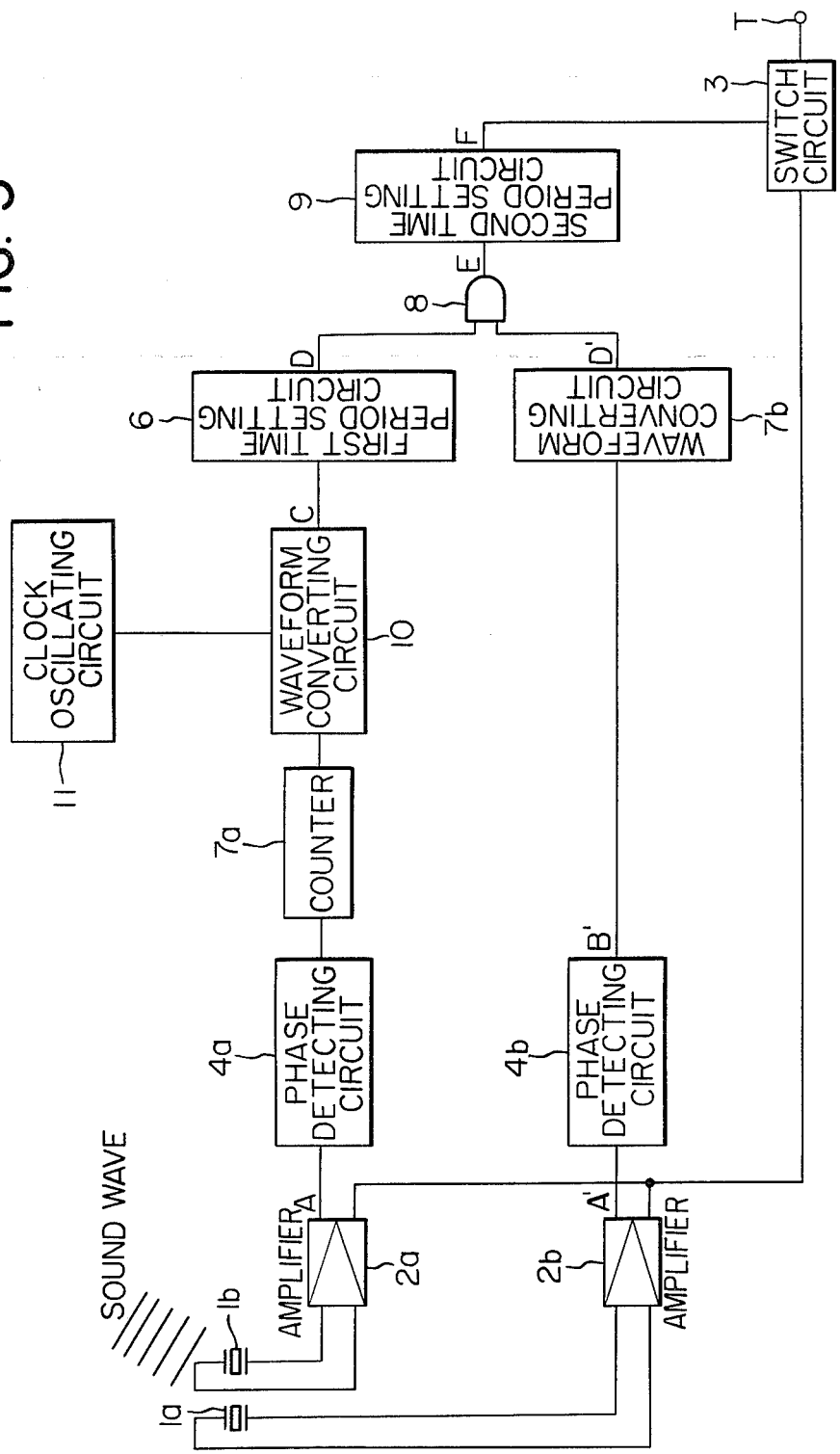
FIG. 5 is a block diagram of the third embodiment of the present invention.

FIG. 5 shows the third embodiment of the present invention, and its circuit is substantially the same as the circuit shown in FIG. 2. Waveform converting circuits $7a$ and $7b$, which output pulses at the falling edges of the outputs of the phase detecting circuits $4a$ and $4b$, are connected to the output sides of these circuits. When the output of the waveform converting circuit $7a$ is produced, a counter 10 counts a predetermined number of clock pulses from a clock oscillating circuit 11.

With the circuit of this construction, when the counter produces an output after counting a predetermined number of clock pulses, the counter 10 functions in the same manner as the delay circuit 5.

Figure 6A:
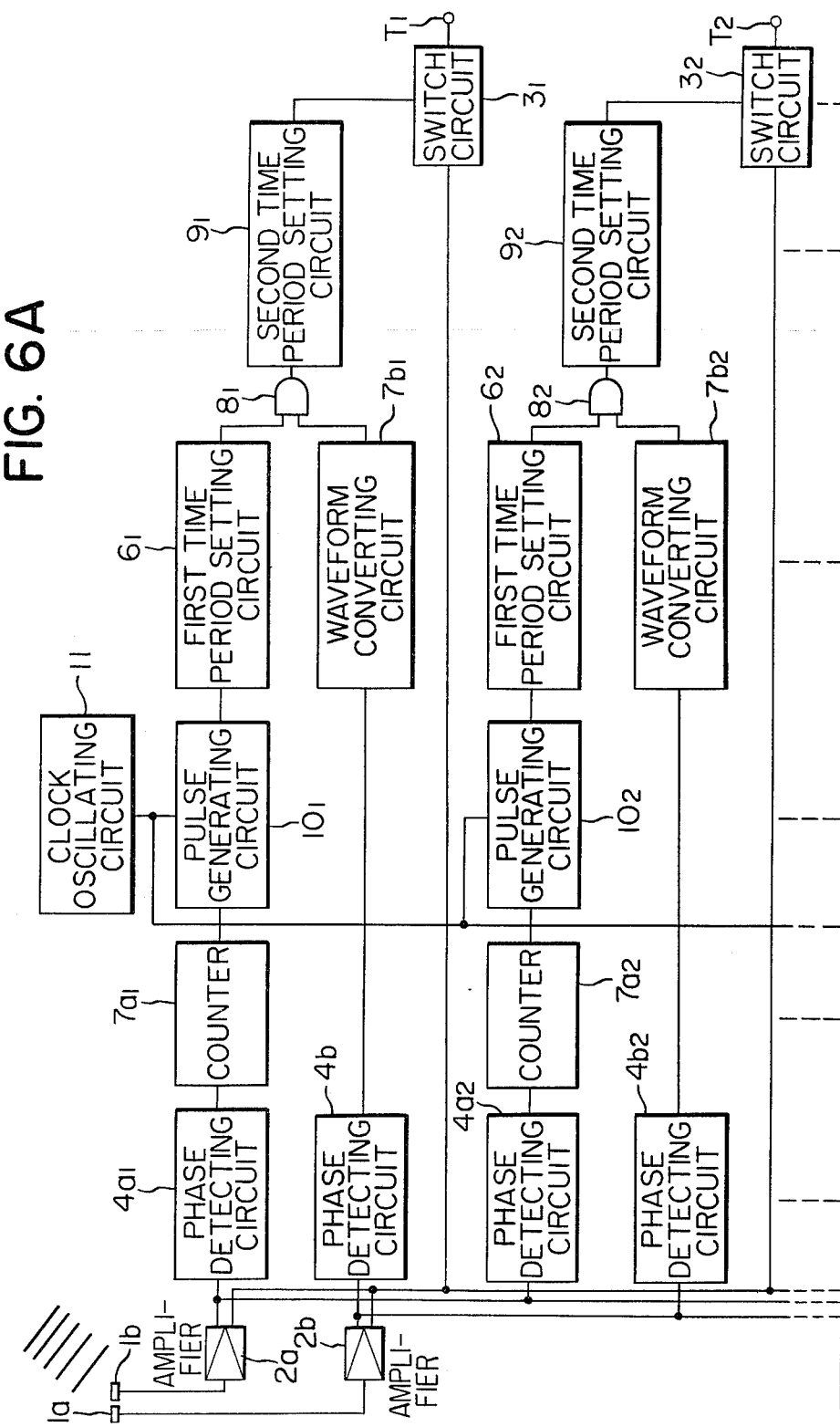

FIG. 6 shows the fourth embodiment of the present invention, which is the same as the circuit shown in FIG. 4, except waveform converting circuits $7a_1$ to $7a_n$ and counters $10_1$ to $10_n$ are included instead of the delay circuits $5_1$ to $5_n$, a clock oscillating circuit 11 is commonly connected thereto, and the reference numerals for the waveform converting circuits $7_1$ to $7_n$ are changed to $7b_1$ to $7b_n$. The counting numbers of the counters $10_1$ to $10_n$ are set to predetermined values.

Since the mode of operation of the fourth embodiment of FIG. 6 of this construction is the same as that of a plurality of the circuits shown in FIG. 5, the description will be omitted.

When the delay time of the delay circuit 5 in the first embodiment shown in FIG. 2 is zero, or when the counting number of the counter 10 in the third embodiment of FIG. 5 is zero, ultrasonic waves entering from the front of the vibrators $1a$ and $1b$ may be detected.

Figure 8:
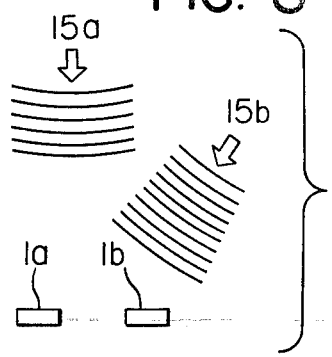
FIG. 8 is a view illustrating the mode of operation of the embodiment shown in FIG. 7.
Figure 9A:
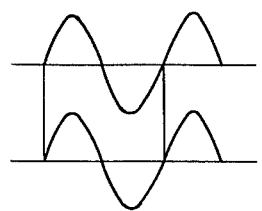
FIG. 9 is a view of an output waveform for illustrating the mode of operation of the embodiment shown in FIG. 7.
Figure 9B:
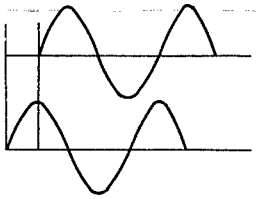
Figure 10A:
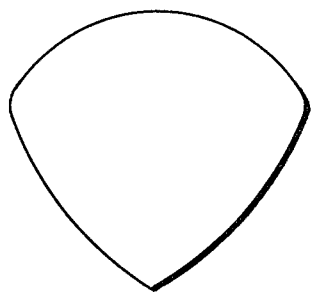
FIG. 10 is a view illustrating the directed angles of the vibrators in the embodiment of FIG. 7.
Figure 10B:

FIG. 7 shows the fifth embodiment of the present invention in which the receiving directional characteristics for the ultrasonic waves entering from the front of the vibrators $1a$ to $1b$ are improved. The sound signals input from the vibrators $1a$ and $1b$ are amplified by the amplifiers $2a$ and $2b$ and are input to the phase detecting circuits $4a$ and $4b$. The phase detecting circuits $4a$ and $4b$ output trigger pulses at points where the waveforms change from the negative side to the positive side and from the positive side to the negative side. In response to the trigger pulses, pulse generating circuits $12a$ and $12b$ output pulses of predetermined periods. These pulses are input to a comparator 13. When the phases of these pulses correspond with each other, an output is produced by the comparator 13. In response to this output, a pulse generating circuit 14 outputs an output pulse. In response to the output pulse, the switch of the switch circuits 3 is closed for outputting the outputs of the amplifiers $2a$ and $2b$ from terminal T. As shown in FIG. 8, with ultrasonic waves $15a$ coming toward the front of the vibrators $1a$ and $1b$, the phases correspond with each other as shown in FIG. 9(A). However, with the sound waves $15b$ coming obliquely toward the vibrators $1a$ and $1b$, the phases are shifted as shown in FIG. 9(B), and this shift becomes larger as the incident angle of the sound waves $15b$ becomes larger. Thus, the construction is such that only the signal when the phases correspond with each other passes the switch circuit 3 as has been described. Due to this construction, only sound waves coming toward the front may be received. The receiving directional characteristics of the sound waves $15a$ from the front are improved by narrowing the output pulses from the pulse generating circuit 12. With this embodiment, the receiving characteristics of any narrow directional angle as shown in FIG. 10(B) may be obtained even when a vibrator of wide directional angle as shown in FIG. 10(A) is used as the vibrators $1a$ and $1b$.

Figure 11:
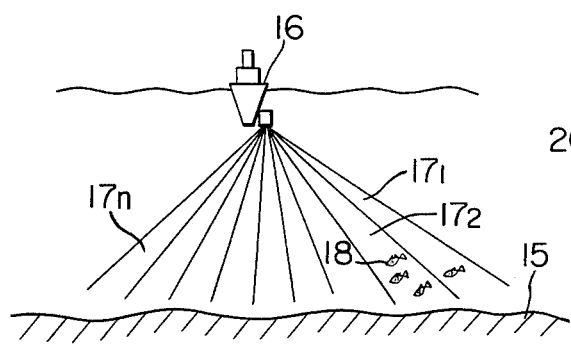
FIG. 11 is a view illustrating a case wherein the circuits of FIG. 4 or 6 are mounted on a ship.

The circuits shown in FIG. 4 or 6 are arranged in a ship 16 as shown in FIG. 11, and transmission beams are radiated in regions $17_1, 17_2, \ldots 17_n$ covered by these circuits so that the direction of a school of fish 18 may be determined by detecting the reflected waves from these regions. Numeral 19 denotes the sea floor.

Figure 12:
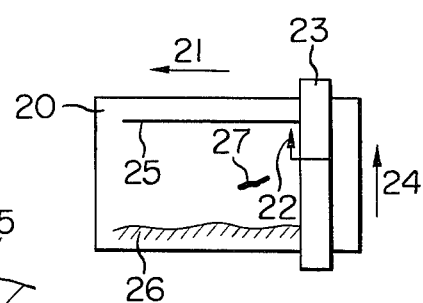
FIG. 12 is a schematic view illustrating the construction of the belt-type recording device.

For displaying the outputs of these circuits, a conventional cathode ray tube system is adopted, and the outputs of n circuits may be simultaneously displayed by the cathode ray tube. Since the circuit construction is simple in this embodiment, this embodiment may be adopted in a recording system using recording paper. As shown in FIG. 12, all of the outputs of the n circuits described above are recorded by a recording device in which a recording paper sheet 20 runs in a direction shown by arrow 21 and a belt 23 with a recording needle 22 runs in a direction shown by arrow 24 for drawing a base line 25, a sea floor 26 and a school of fish 27 on the recording paper sheet 20. When the school of fish 27 is recorded, the circuit in which the signal of the school of fish is output may be selected from the n circuits for recording. Further, it is possible to divide the recording region of the recording paper sheet 20 into a plurality of rows and to record in a plurality of directions.

Figure 13:
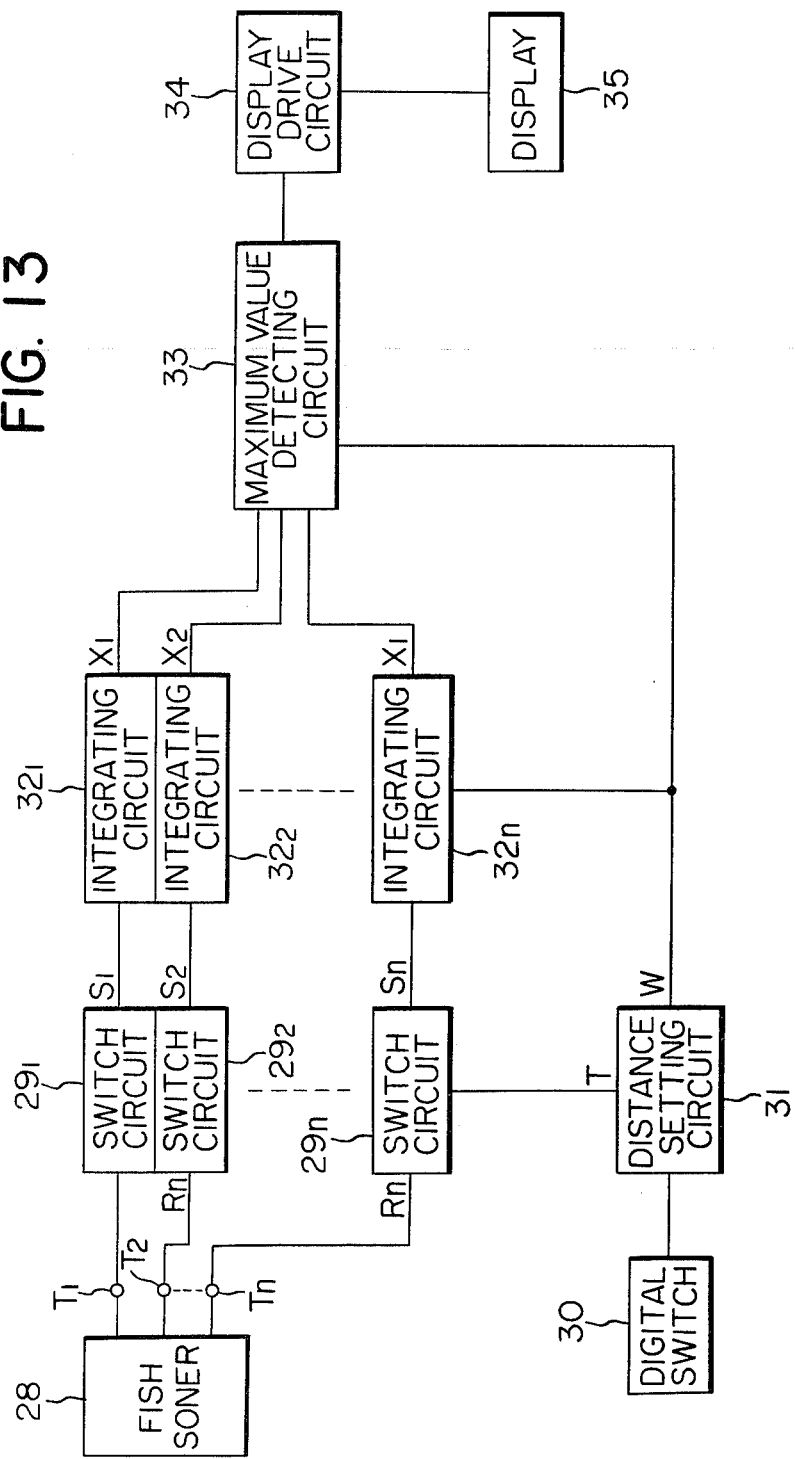
FIG. 13 is a block diagram of the sixth embodiment of the present invention.
Figure 14:
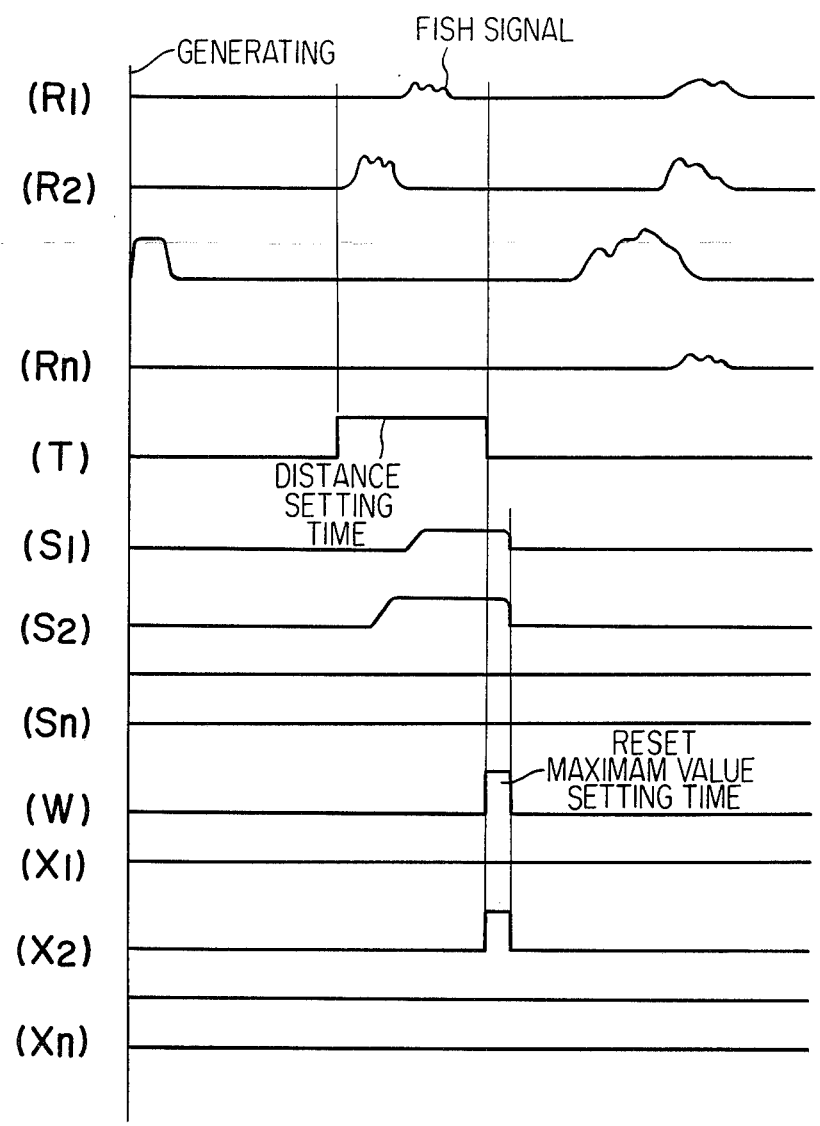
FIG. 14 is a view of output waveforms of respective parts of FIG. 13.

FIG. 13 shows the sixth embodiment of the present invention wherein numeral 28 denotes a circuit as shown in FIG. 4 or 6 having terminals $T_1, T_2, \ldots T_n$. Its outputs $R_1, R_2, \ldots R_n$ are input to switch circuits $29_1, 29_2, \ldots 29_n$, and the waveforms of these outputs $R_1, R_2, \ldots R_n$ are represented by $(R_1), (R_2), \ldots (R_n)$ in FIG. 14. These switch circuits $29_1$ to $29_n$ are turned on by the output (FIG. 14(T)) of a distance setting circuit 31 which produces an output T during the time set by a digital switch 30 only. The outputs $S_1, S_2, \ldots S_n$ of the switch circuits $29_1$ to $29_n$ (FIG. 14($S_1$), ($S_2$), ... ($S_n$)) are input to integrating circuits $32_1, 32_2, \ldots 32_n$. The outputs of the integrating circuits $32_1$ to $32_n$ are input to a maximum value detecting circuit 33. The integrating circuits $32_1$ to $32_n$ and the maximum value detecting circuit 33 are operated only during a maximum value detecting time of an output W (FIG. 14(W)) of the distance setting circuit 31. As the output of the maximum value detecting circuit 33, the maximum value $X_2$ of outputs $X_1, X_2, \ldots X_n$ of the integrating circuits (FIG. 14($X_1$), ($X_2$), ... ($X_n$)) is output by a display drive circuit 34, and the maximum output $X_2$ is displayed at a display 35.

Figure 15A:
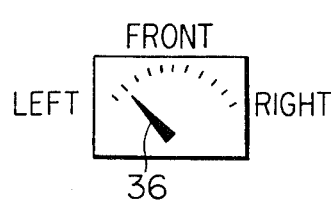
FIG. 15 is a front view of a display device.
Figure 15B:
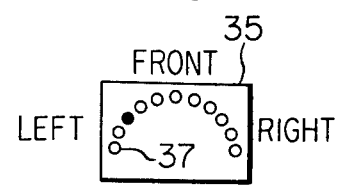

According to this sixth embodiment, the reaction of the school of fish is detected over a wide area as shown in FIG. 11. When the school of fish is detected at a depth of 100 m from the sea surface, for example, the digital switch 30 is operated to set the time t to the value at which the sound waves travel to 100 m from the sea surface. The switch circuits $29_1$ to $29_n$ are turned on by an output from the distance setting circuit 31 when this time t has passed. The outputs of the circuits $28_1$ to $28_n$ are integrated by the integrating circuits $31_1$ to $31_n$, respectively, and the maximum value among the integrated values is output from the maximum value detecting circuit 33. In this instance, by varying the output level of the display drive circuit 34 depending on the direction, the display 35 may be a display device having a pointer 36 as shown in FIG. 15(A), or a display device having a pilot lamp, an LED, or an LDC 37 as shown in FIG. 15(B).

Figure 17:
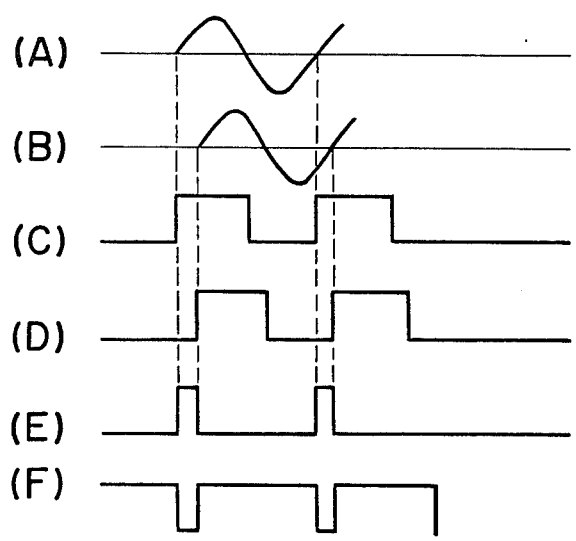
FIG. 17 is a view illustrating output waveforms of respective parts of FIG. 16.

FIG. 16 shows a block diagram of the seventh embodiment of the present invention, wherein the outputs of the pair of vibrators 1a and 1b (FIG. 17(A) and 17(B)) are amplified by the amplifiers 2a and 2b and are input to the waveform shaping circuits 4a and 4b. The distance between the vibrators is preferably λ/2. These waveform shaping circuits 4a and 4b convert the outputs of the amplifiers 2a and 2b to square waves in such a manner that their phase difference may be easily detected, as shown in FIGS. 17(C) and 17(D). At the outputs of the waveform shaping circuits 4a and 4b, waveforms shown in FIGS. 17(E) and 17(F) are obtained from phase difference detecting circuits 38a and 38b by detecting the time from the rising edge (falling edge) of the output (FIG. 17(D)) of the waveform shaping circuit 4b to the rising edge (falling edge) of the output (FIG. 17(C)) of the waveform shaping circuit 4a, and by further detecting the time from the rising edge (falling edge) of the output (FIG. 17(C)) of the waveform shaping circuit 4a to the rising edge (falling edge) of the output (FIG. 17(D)) of the waveform shaping circuit 4b. The widths of the positive going parts of the waveforms shown in FIGS. 17(E) and 17(F) correspond to the phase difference time of the outputs of the waveform shaping circuits 4a and 4b. The outputs of phase difference detecting circuits 38a and 38b are input to the counter circuits 39a and 39b which count the clock pulses from a clock pulse generator 40 for lines corresponding to the phase difference of the outputs of the phase difference circuits 38a and 38b. The counted outputs of the counter circuits 39a and 39b are input to an ultrasonic wave direction detection circuit 41 and judged. When the phase shifts by 180°, as may be seen from FIGS. 17(A) and 17(B) when the distance between the oscillators is λ/2, the outputs of the counter circuits 39a and 39b become equal. This represents that the ultrasonic waves are coming from the direction of the line connecting the two vibrators. Since the direction of the ultrasonic waves is represented by the smaller count number, the direction of the ultrasonic waves is judged by the output of the counter circuit 39a in this embodiment and is output from the ultrasonic wave direction detecting circuit 41. The received ultrasonic wave signal may be detected by the switch circuit 3 in response to this output from the circuit 41.

What is claimed is:
1. Sonar receiving apparatus, comprising:
first and second adjacent sonar transducers for converting sonic waves to corresponding first and second received electrical signals;
first and second wave shaping means responsive to corresponding ones of said first and second received signals for providing first and second generally rectangular waves having leading or trailing edge transitions at times corresponding to zero crossovers of said first and second received signals respectively;
a first phase difference circuit for providing a first phase difference signal having a duration corresponding to the time difference between each edge transition of said first rectangular wave and the immediately succeeding edge transition of said second rectangular wave;
a second phase difference circuit for providing a second phase difference signal having a duration corresponding to the time difference between each edge transition of said second rectangular wave and the immediately succeeding edge transition of said first rectangular wave;
a first counter circuit coupled to said phase difference circuits for counting clock pulses for the duration of said first phase difference signal;
a second counter circuit coupled to said phase difference circuits for counting said clock pulses for the duration of said second phase difference signal; and
a sonic wave direction detecting circuit coupled to the outputs of said counters for providing a sonic wave direction indicating signal having a value indicative of the one of said counters having the lower output and of the magnitude of said lower output.

2. The sonar receiving apparatus according to claim 1, further comprising:
   display or recording means; and
   switch means coupled in circuit between at least one of said transducers and said display or recording means and responsive to a predetermined value of said sonic wave direction indicating signal.

* * * * *